(12) United States Patent
Naunheimer et al.

(10) Patent No.: US 7,874,769 B2
(45) Date of Patent: Jan. 25, 2011

(54) METHOD FOR TRANSFERRING PARTICLES

(75) Inventors: Christopher Naunheimer, Arlington Heights, IL (US); Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/332,564

(22) Filed: Dec. 11, 2008

(65) Prior Publication Data

US 2010/0150669 A1    Jun. 17, 2010

(51) Int. Cl.
    *B65G 53/00*    (2006.01)
(52) U.S. Cl. .................... 406/197; 406/12; 406/22; 406/23; 406/34; 208/173; 208/176
(58) Field of Classification Search .................. 406/12, 406/22, 23, 34, 136, 192, 197, 198; 414/217, 414/220; 208/173, 176, 147
See application file for complete search history.

(56) References Cited

U.S. PATENT DOCUMENTS

| | | | | |
|---|---|---|---|---|
| 2,562,804 A | * | 7/1951 | Martin et al. | 502/38 |
| 2,705,080 A | * | 3/1955 | Hicks | 414/220 |
| 2,851,401 A | * | 9/1958 | Payne | 208/173 |
| 2,851,402 A | * | 9/1958 | Haddad | 208/175 |
| 2,985,324 A | * | 5/1961 | Balentine | 414/217 |
| 3,067,131 A | * | 12/1962 | Bergstrom | 208/173 |
| 3,692,496 A | | 9/1972 | Greenwood et al. | 23/288 G |
| 3,725,249 A | | 4/1973 | Vesely et al. | 208/139 |
| 3,745,112 A | | 7/1973 | Rausch | 208/139 |
| 4,035,153 A | | 7/1977 | Bunn, Jr. et al. | 23/288 B |
| 4,108,500 A | * | 8/1978 | Stamer | 406/12 |
| 4,341,740 A | * | 7/1982 | Greenwood | 422/310 |
| 4,401,402 A | | 8/1983 | Casperson | 414/218 |
| 4,403,909 A | * | 9/1983 | Greenwood | 414/805 |
| 4,430,517 A | | 2/1984 | Imai et al. | 585/660 |
| 4,576,712 A | | 3/1986 | Greenwood | 208/138 |
| 4,578,370 A | | 3/1986 | Greenwood | 502/37 |
| 4,615,792 A | | 10/1986 | Greenwood | 208/134 |
| 4,654,455 A | | 3/1987 | Chao | 585/415 |
| 4,746,763 A | | 5/1988 | Kocal | 585/417 |
| 4,758,118 A | * | 7/1988 | Rachner et al. | 406/24 |
| 4,872,969 A | | 10/1989 | Sechrist | 208/173 |
| 5,076,908 A | | 12/1991 | Stangeland et al. | 208/148 |
| 5,143,521 A | * | 9/1992 | Dewitz | 48/210 |
| 5,338,440 A | | 8/1994 | Sechrist et al. | 208/173 |

(Continued)

OTHER PUBLICATIONS

Jenike, A.W., "Storage and Flow of Solids" Bulletin No. 123, Utah Engineering Experiment Station, University of Utah, Salt Lake City, Utah; vol. 53, No. 26, Sixth Printing (revised) Mar. 1970.

(Continued)

*Primary Examiner*—Joe Dillon, Jr.
(74) *Attorney, Agent, or Firm*—David J Piasecki

(57) ABSTRACT

Method and apparatus are provided for transferring particles from an upper zone through an intermediate zone to a lower zone. The transfer of particles between the zones through valveless conduits is regulated by varying the pressure of the intermediate zone and the flow rate of gas passing through the valveless conduits. A body within the lower zone is in particle communication with a valveless conduit and obstructs the particle flow within the lower zone.

19 Claims, 6 Drawing Sheets

U.S. PATENT DOCUMENTS

| | | | | |
|---|---|---|---|---|
| 5,500,110 A | | 3/1996 | Sechrist et al. | 208/173 |
| 5,545,312 A | | 8/1996 | Lawrence et al. | 208/152 |
| 5,558,472 A | * | 9/1996 | Ogawa et al. | 406/12 |
| 5,584,615 A | | 12/1996 | Micklich | 406/109 |
| 5,707,198 A | | 1/1998 | Vind | 414/219 |
| 5,716,516 A | | 2/1998 | Micklich | 208/174 |
| 5,840,176 A | | 11/1998 | Lawrence et al. | 208/152 |
| 5,858,210 A | | 1/1999 | Richardson | 208/173 |
| 5,916,529 A | * | 6/1999 | Scheuerman | 422/141 |
| 6,034,018 A | | 3/2000 | Sechrist et al. | 502/35 |
| 6,395,664 B1 | * | 5/2002 | Boehner et al. | 502/22 |
| 6,461,992 B1 | | 10/2002 | Sechrist et al. | 502/35 |
| 6,657,096 B2 | | 12/2003 | Boehner et al. | 585/418 |
| 6,969,496 B2 | | 11/2005 | Vetter et al. | 422/221 |
| 6,994,497 B1 | * | 2/2006 | Eriksson et al. | 406/124 |
| 7,172,685 B2 | * | 2/2007 | Thompson et al. | 208/208 R |
| 7,600,950 B2 | * | 10/2009 | Yuan | 406/156 |

OTHER PUBLICATIONS

U.S. Appl. No. 11/832,008, filed Aug. 1, 2007, David J. Fecteau et al.
U.S. Appl. No. 11/832,059, filed Aug. 1, 2007, David J. Fecteau et al.
U.S. Appl. No. 12/261,109, filed Oct. 30, 2008, Christopher Naunheimer et al.
U.S. Appl. No. 12/261,115, filed Oct. 30, 2008, Christopher Naunheimer et al.
U.S. Appl. No. 12/332,559, filed Dec. 11, 2008, Christopher Naunheimer et al.
U.S. Appl. No. 12/273,689, filed Nov. 19, 2008, Christopher Naunheimer et al.
U.S. Appl. No. 12/332,567, filed Dec. 11, 2008, Christopher Naunheimer et al.
U.S. Appl. No. 12/361,181, filed Jan. 28, 2009, Christopher Naunheimer et al.
U.S. Appl. No. 12/340,842, filed Dec. 22, 2008, Christopher Naunheimer et al.
U.S. Appl. No. 12/361,186, filed Jan. 28, 2009, Christopher Naunheimer et al.

* cited by examiner

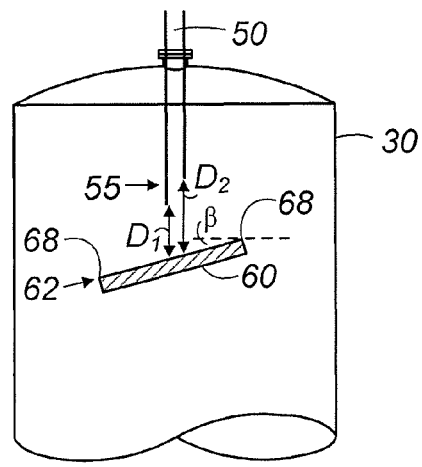
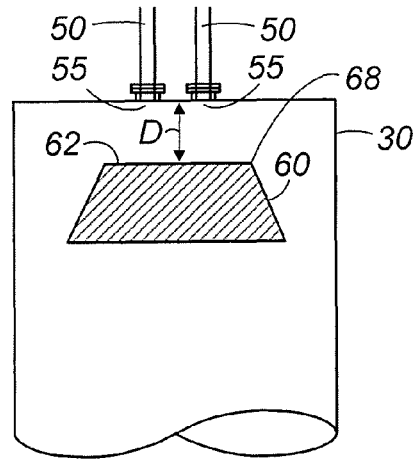
FIG. 5A  FIG. 5B
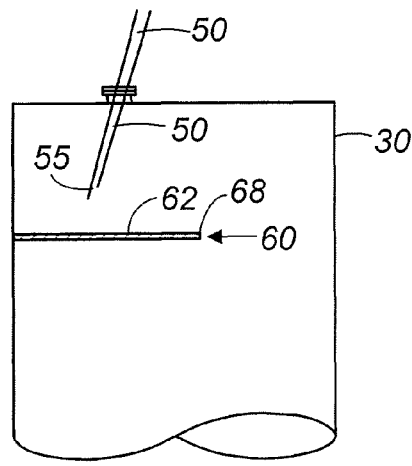
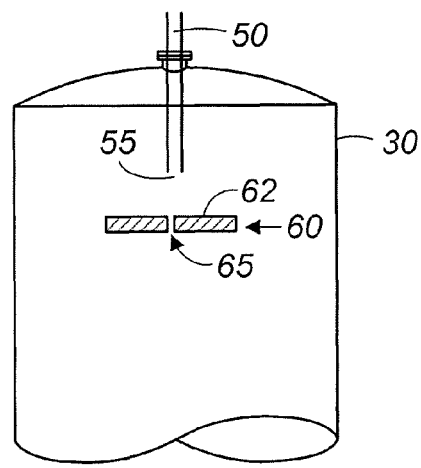
FIG. 5C  FIG. 5D

METHOD FOR TRANSFERRING PARTICLES

FIELD OF THE INVENTION

This invention generally relates to the art of solid particle transport. More specifically, the invention relates to methods and apparatus for transferring particles from an upper zone through a middle zone to a lower zone.

BACKGROUND OF THE INVENTION

There are many chemical processes where it is necessary to bring into contact a fluid and a solid particulate matter, such as adsorbents and catalysts. Frequently, chemical reactions as well as physical phenomena occur for a predetermined period of time in the contact zone, e.g. a reaction or adsorption zone. In many of these processes, the particles are transported between two or more particle containing vessels. The particles may be transported for a variety of reasons depending on the process. For example, particles may be transported from one contacting vessel or zone into another contacting zone in order to take advantage of different process conditions to improve product yields and/or purity. In another example, particles may be transported from a reaction zone into a regeneration zone in order to rejuvenate the particles, and after rejuvenation, the particles may be transported back to the reaction zone. The particles may be introduced to and withdrawn from the vessels or zones in a continuous or semi-continuous manner sufficient to maintain the desired contacting process continuously.

The vessels between which the catalyst is transported are not necessarily adjacent. The outlet of the source vessel from which the catalyst is transported may be a significant distance horizontally and/or vertically from the inlet of the destination vessel to which the catalyst is transported. Pneumatic conveying through a conduit is a well known and commonly used method of transferring catalyst over vertical and horizontal distances. One characteristic of pneumatic conveying is that because of the pressure difference across the conduit between the source and destination, the destination pressure must be less than the source pressure to account for the pressure drop across the pneumatic conveying system. However, process conditions may require the destination vessel to operate at a higher pressure than this value (source pressure minus pneumatic conveying system pressure drop). Examples include circulating particles between two zones maintained at different pressures; and transferring particles from one vessel to another where both vessels are maintained at the same pressure. Under such conditions, a pneumatic conveying system alone is insufficient to transfer the particles.

A lock hopper is commonly used to transfer particles from a lower pressure zone to a higher pressure zone. The use of lock hoppers in conjunction with pneumatic conveying is also well known in the art to transfer particles between vessels or zones that are maintained at different pressures. First, a lock hopper transfers particles from the upper, low pressure source zone to a middle zone, and then to a lower, high pressure zone. A pneumatic conveying system then transfers the particles from the high pressure zone to the destination zone. Although the destination zone has a pressure less than that of the high pressure zone, the destination zone pressure may be greater than that of the low pressure source. In the art, the term "lock hopper" has been used to designate the combination of the upper, middle, and lower zones, and "lock hopper" has been used to designate only the middle zone.

In one example, the flow of particles from an upper vessel into the middle zone and out of the middle zone into a lower zone is controlled by valves located in the conduits or transfer pipes that connect the zones. The valves may be double block-and-bleed ball valves. Thus, a batch of particles may be transferred to the middle zone through the upper valve or valves when the lower valve or valves are closed. The middle zone may then be isolated by closing the upper valve(s). Various conduits may be connected to the isolated volume to introduce or remove the fluid phase, usually gas, or change the pressure inside the middle zone. For example, a regenerated catalyst may enter the vessel, be purged with nitrogen to remove oxygen, and pressured with hydrogen before being transferred to the reactor which is at a higher pressure than the regenerated catalyst. After catalyst exits the middle zone, the middle zone can be purged with nitrogen to remove the hydrogen before filling again with catalyst.

U.S. Pat. No. 4,576,712 discloses a method and apparatus for maintaining a substantially continuous gas flow through particulate solids in two zones. The solids are moved from a low pressure zone to a high pressure zone by means of a valveless lock hopper system. Maintenance of gas flow while simultaneously transferring particles between zones is accomplished without the use of moving equipment such as valves.

U.S. Pat. No. 4,872,969 discloses a method and apparatus for controlling the transfer of particles between zones of different pressure using particle collection and particle transfer conduits. The solids are moved from a low pressure zone to a high pressure zone by means of a valveless lock hopper system that vents all of the gas from the collection zones through the particle collection conduits. The venting of gas is accomplished by varying the size of the transfer conduits between zones.

As is known in the art, physical characteristics of the particles and basic process information such as the operating pressure in the upper and lower zones and the acceptable range of gas flow rates are initial design information. Processes are designed from this basic information and standard particle and gas engineering principles to routinely provide stable operating units. Surprisingly, it has been found that a particular unit will operate predominantly in a stable manner but experience sporadic upsets. These upsets involving a sudden surge of particles from one zone to another, which may reverse the particle flow, have been unpredictable with respect to which unit will be affected, and which particle transfer cycle will experience an upset in an affected unit. These upsets occur despite conformance to the same design methods. Such upsets interrupt the consistent flow of particles and can physically damage the particles as well as the equipment.

Consequently, there is desire to eliminate these sporadic upsets in order to minimize damage to the equipment and particles and ensure the consistent flow of particles. The consistent flow or transfer of particles involves a series of steps which can be repeated in a cyclic manner to transfer the particles in batches. Although it remains unpredictable whether an upset will occur during any particular cycle in an apparatus, we have discovered that the upsets usually occur during the middle zone depressurization step or the middle zone empty step. Our invention provides an improved method and apparatus that eliminates all or many of these sporadic upsets without negatively impacting the vast majority of operating units or cycles that do not experience upsets.

SUMMARY OF THE INVENTION

The invention is a method and apparatus for transferring particles from an upper zone through a middle zone to a lower zone where the zones are connected by valveless conduits.

The lower zone may have a higher pressure than the upper zone. A body within the lower zone is in particle communication a valveless conduit. The transfer of particles from the upper zone to the lower zone is controlled by varying the pressure of the middle zone and the flow rates of gas passing upwards through the valveless conduits. The body obstructs the particle flow within the lower zone.

In a broad embodiment, the invention is a method for transferring particles from an upper zone, through a middle zone, to a lower zone comprising: introducing a first gas stream into the lower zone; transferring particles downward from the upper zone to the middle zone through an upper valveless conduit, and transferring gas from the lower zone upward through a lower valveless conduit into the middle zone; increasing the middle zone pressure; transferring particles downward from the middle zone to the lower zone through the lower valveless conduit, obstructing a particle flow in the lower zone with a particle impervious body comprising a planar surface, and transferring gas from the middle zone upward through the upper valveless conduit into the upper zone; and decreasing the middle zone pressure.

In another broad embodiment, the invention is an apparatus for transferring particles comprising: an upper zone; a middle zone; a lower zone; a body located within the lower zone, the body being impervious to the particles and comprising a planar surface; an upper valveless conduit extending from the upper zone to the middle zone; a lower valveless conduit extending from the middle zone to the lower zone, the lower valveless conduit comprising an outlet, the outlet being located above and vertically aligned with the planar surface of the body; a gas inlet conduit providing fluid communication to the lower zone; and a first gas conduit in fluid communication with the middle zone.

In another broad embodiment, the invention is a moving bed hydrocarbon conversion process comprising: contacting a catalyst moving downward through a reaction zone with a hydrocarbon feed; withdrawing the catalyst from the reaction zone; conveying the catalyst to a regeneration zone wherein the catalyst moves downward through the regeneration zone; withdrawing the catalyst from the regeneration zone and passing the catalyst downward to an upper zone of a particle transfer apparatus; introducing a first gas stream into a lower zone of the particle transfer apparatus; transferring the catalyst downward from the upper zone to a middle zone of the particle transfer apparatus through an upper valveless conduit, and transferring gas from the lower zone upward through a lower valveless conduit into the middle zone; increasing the middle zone pressure; transferring the catalyst downward from the middle zone to the lower zone through the lower valveless conduit, obstructing a catalyst flow in the lower zone with a particle impervious body comprising an upper planar surface, and transferring gas from the middle zone upward through the upper valveless conduit into the upper zone; decreasing the middle zone pressure; and conveying the catalyst from the lower zone to the reaction zone; wherein a pressure of the lower zone is greater than a pressure of the upper zone.

BRIEF DESCRIPTION OF THE DRAWINGS

FIGS. 5A-5D illustrate additional configurations of the body within the lower zone and the lower valveless conduit that are encompassed by the invention.

Figure 1:
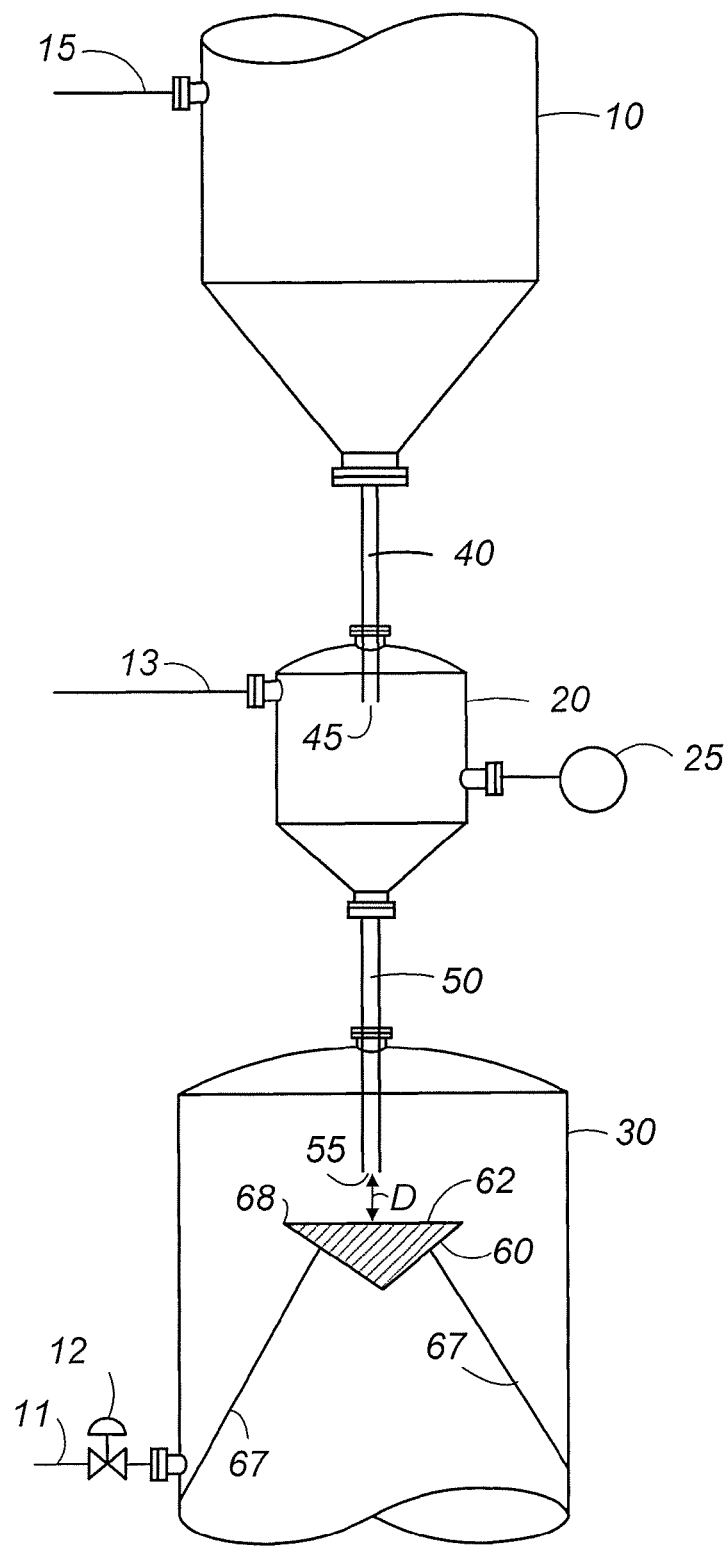
FIG. 1 is a representative view depicting the zones of the apparatus in different vessels and an embodiment of the body in the lower zone.

The Figures are intended to be illustrative of the invention and are not intended to limit the scope of the invention as set forth in the claims. The drawings are simplified diagrams showing exemplary embodiments helpful for an understanding of the invention. Details well known in the art, such as cone deflectors, control valves, instrumentation, and similar hardware which are non-essential to an understanding of the invention may not be shown.

DETAILED DESCRIPTION OF THE INVENTION

The invention may be used to transfer solid particulate matter from an upper zone, through a middle zone, to a lower zone where the lower zone pressure is greater than the upper zone pressure. The invention transfers particles without using moving equipment such as valves to block the particle flow path. Generally, particles received in an upper zone are transferred through an upper valveless standpipe or transfer conduit to a middle zone. A lower valveless standpipe or transfer conduit is used to transfer the particles from the middle zone towards an obstruction or body located within a lower zone. Thus the zones, valveless conduits, and obstruction or body may be in particle communication and the valveless conduits may provide particle communication.

The invention can be used within and/or between a variety of process units to transfer particles, such as catalyst and adsorbents. The upper zone of the invention may receive particles from a separate process zone and the lower zone may deliver the particles to another separate process zone. For example, an associated process unit may include a separate vessel that operates as a reaction zone which provides catalyst particles to the upper zone, and the lower zone may deliver catalyst to a separate process vessel such as a feed hopper of a pneumatic conveying apparatus which in turn delivers the catalyst to the top of another reactor. In another embodiment, the invention may be arranged so that the upper zone and/or the lower zone are integrated with a process unit such that one or more process steps, or portions thereof, occurs within the upper and/or lower zones or the vessel(s) which contain the upper and/or lower zones. For example, the upper zone may be the lower portion of a reduction zone vessel or the entire reduction zone vessel of a process unit and/or the lower zone may be the upper portion of a surge vessel or the entire surge vessel of a process unit. The surge vessel in turn may introduce the particles into other zones of the same or a different process unit.

The invention may communicate with or the invention may comprise a portion of a process unit which provides for changing the fluid that contacts the particles. For example, the process unit may involve contacting catalyst with a gas containing hydrocarbons and/or hydrogen in a reaction zone and removing carbon deposits from the catalyst using a gas containing oxygen in a regeneration zone. As the catalyst is transferred between the reaction and regeneration zones, care must be taken to prevent mixing of the hydrocarbon/hydrogen atmosphere and the oxygen atmosphere. Examples of hydrocarbon conversion processes that may employ the invention include: alkylation, hydrorefining, hydrocracking, dehydrogenation, hydrogenation, hydrotreating, isomerization, dehydroisomerization, dehydrocyclization, and steam reforming. One widely practiced hydrocarbon conversion process that may employ the invention is catalytic reforming using particles of catalyst. Exemplary reaction and regeneration zones are disclosed in, e.g., U.S. Pat. No. 5,858,210.

The upper, middle, and lower zones of the invention may be separate vessels or portions of separate vessels that are connected by valveless transfer conduits. In other embodiments, two or more of the upper, middle, and lower zones may be contained within a single vessel and separated by dividers within the vessel. The upper, middle, and lower zones of the invention may also provide one or more functions or process steps of an associated process unit. In an embodiment, the upper, middle, and lower zones may be aligned sufficiently vertically to allow catalyst to flow, at least in part, by gravity from at least one vessel at a higher elevation to at least one vessel at a lower elevation.

Flow of the particles into and out of the middle zone may be controlled by regulating the pressure of the middle zone, the flow rate of gas through each valveless particle transfer conduit, and the gas flow path. The same basic method steps may be accomplished by various configurations of gas and particle conduits to introduce, vent, and change the flow path of the gas used to control particle transfers. U.S. Pat. Nos. 4,576,712 and 4,872,969 disclose different methods and apparatus to control particle transfer and are hereby incorporated by reference in their entirety. The invention may use the same basic method steps and is not limited to any particular configuration of the gas flow path and conduits. Existing configurations and control schemes can be readily adapted to employ the invention.

The method of transferring particles from upper zone 10 to lower zone 30 may be accomplished without blocking the particle transfer path with moving equipment such as valves by repeating the following four step cycle: 1) a fill or load step wherein particles are transferred from the upper zone to the middle zone; 2) a pressurization step wherein the middle zone pressure is increased; 3) an empty step wherein particles are transferred from the middle zone towards the obstruction or body within the lower zone; and 4) a depressurization step wherein the middle zone pressure is decreased. The steps may overlap. For example, transfer of particles may begin while the middle zone pressure continues to increase or decrease and the middle zone pressure may begin to increase or decrease while particles continue to transfer.

A single cycle results in the transfer of one batch of particles from the upper zone to the lower zone. The time required to complete one cycle, i.e. the cycle time, will depend on a variety of factors including: the properties of the particles; the batch size, or amount of particles transferred per cycle; and the times needed to change the pressure of the middle zone. The invention is not limited by the cycle time. In an embodiment, the cycle time may be about 50 seconds. In another embodiment, the cycle time may be less than about 10 minutes, and the cycle time may be between about 2 minutes and about 4 minutes. A controller such as process control computers and programmable controllers may be used to regulate the cycle. The controller may receive various inputs, e.g. signals from particle level sensors, pressure gauges or indicators, differential pressure sensors, and timers such as for an individual step and/or the overall cycle. The controller may also send signals for example to open, close, and adjust valves to control the flow pattern and rate of various gas steams. Such a controller and related signals are not shown in the figures as they are not essential to the invention and are well known to the skilled artisan.

Figure 6:
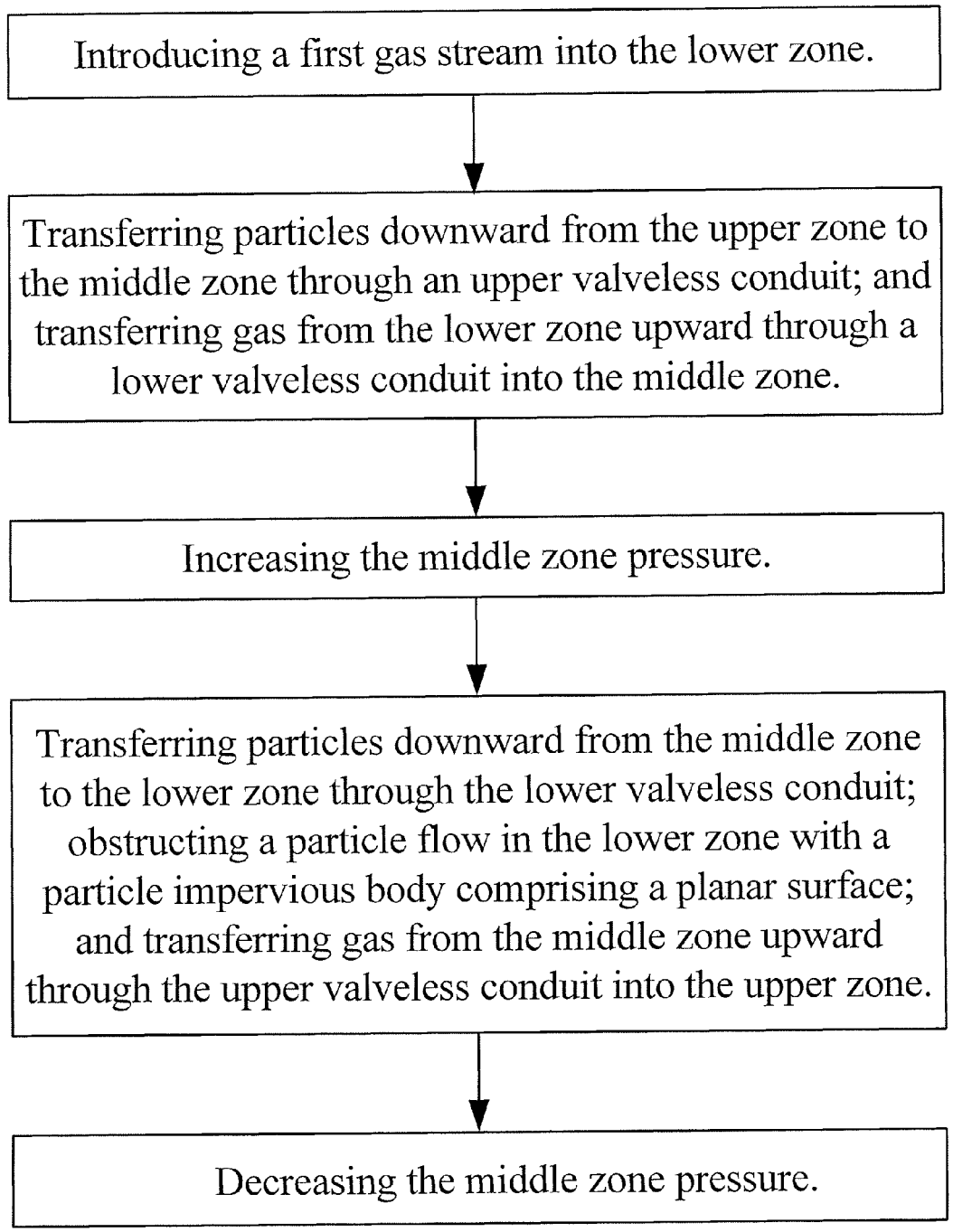
FIG. 6 illustrates an embodiment of the method for transferring particles from an upper zone through a middle zone to a lower zone.

Broad embodiments of the invention will now be described with reference to FIG. 1. An embodiment of the method for transferring particles as described below is illustrated in FIG. 6. In step 1 of the method, particles are transferred from upper zone 10 to middle zone 20 through upper valveless conduit 40. The upper and middle zones are at approximately the same pressure during step 1. Gas ascending through upper valveless conduit 40, if any, is insufficient to retain the particles in conduit 40. During step 1, gas may enter lower zone 30 through gas inlet conduit 11. Gas may also enter lower zone 30 from an associated process zone, not shown. Valve 12 may regulate the quantity of gas flowing into lower zone 30; this flow rate may be varied independently of the invention by means, not shown, for controlling the pressure of lower zone 30. The gas is selected to be compatible with the particles being transferred and may be the same gas as used in the associated process unit. Nitrogen, hydrogen, and air are non-limiting examples of gas that may be used.

Figure 2:
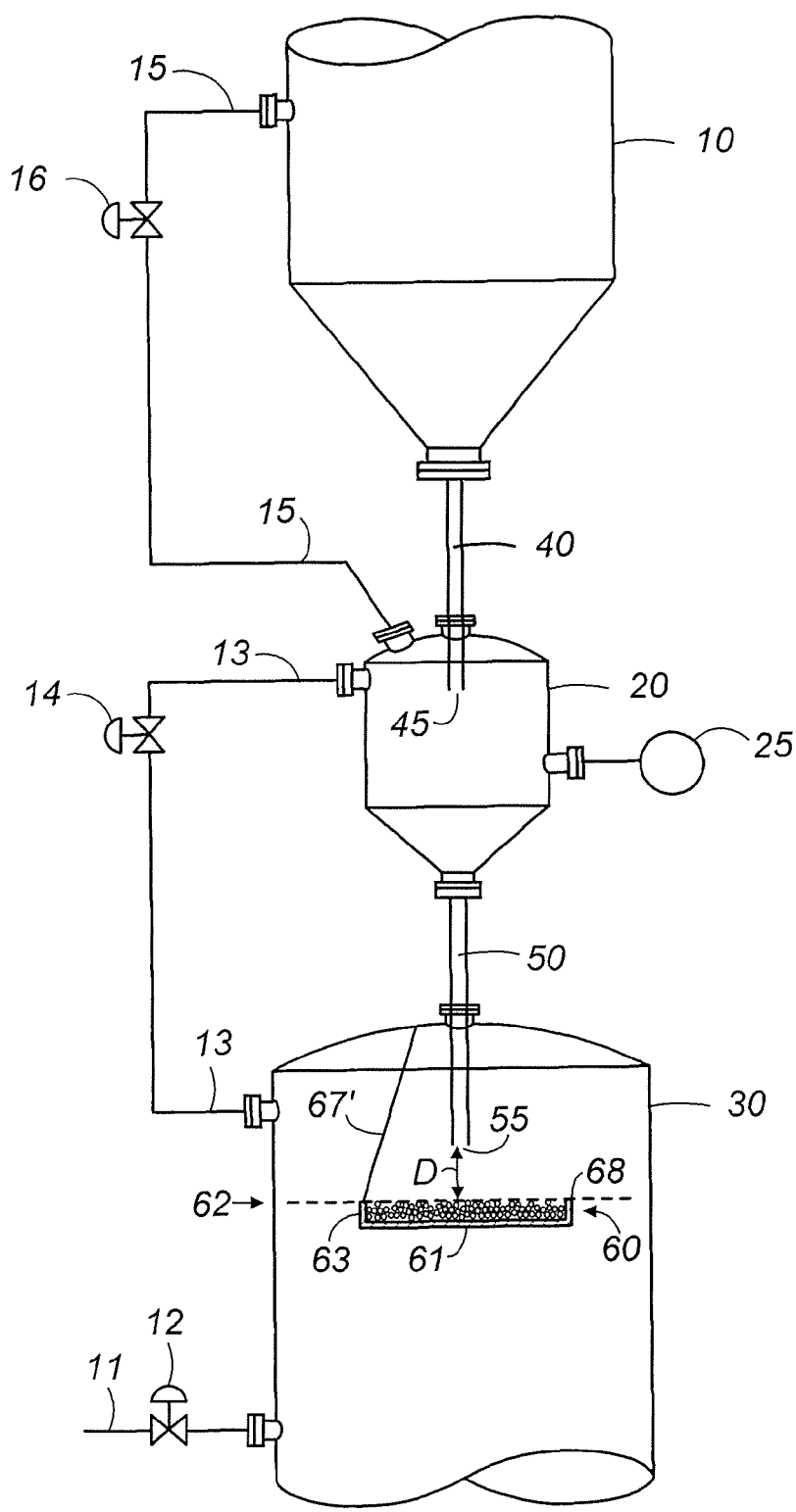
FIG. 2 is a representative view depicting another embodiment of the body in the lower zone and an arrangement of gas conduits used in an embodiment of the invention.

During step 1, gas flows upward from lower zone 30 through lower valveless conduit 50 at a sufficient rate to retain the particles in conduit 50 thus causing middle zone 20 to fill with particles. Various configurations of the gas flow path may be used. For example, a portion of the gas entering middle zone 20 from lower valveless conduit 50 may flow through gas conduit 15 to upper zone 10 as shown in FIG. 2. In other embodiments not illustrated, a portion of the gas may flow through gas conduit 15 to another destination or simply be vented. In the embodiment illustrated in FIG. 3, which depicts the three zones of the apparatus in one vessel, upper valveless conduit 40 has a larger diameter than lower valveless conduit 50 so that all gas entering middle zone 20 may flow through upper valveless conduit 40 at a flux which is insufficient to retain the catalyst therein.

Upper 40 and/or lower 50 valveless particle transfer conduits may have a restriction, that is, a smaller cross-sectional area for particle flow than the balance of the respective conduit. The cross-sectional areas of the restrictions if present and the balance of the conduit may be any regular or irregular shape including a circle, oval, square, rectangle, and triangle. The cross-sectional area shape of a conduit may be the same or it may differ over its length and may be the same or different in the upper 40 and lower 50 valveless conduits. The cross-sectional area of a restriction and the balance of the conduit may have different shapes or the same shape. The restriction may be located in a lower portion of the conduit, that is, in the lower ⅓ of the respective conduit's height. The restrictions may be created in a wide variety of ways including crimping the conduit, using an insert, and forming the conduit with the restriction. Restrictions may be located proximate an outlet in the lowermost end of the conduit. In an embodiment, the conduit, or a portion thereof is tapered toward the outlet to form the restriction at the outlet. The type, cross-sectional area shape, and/or location of restrictions in upper 40 and lower 50 valveless conduits may be the same, or they may differ.

Step 1 ends when middle zone 20 is filled to its operating capacity with particles. As shown in FIG. 1, upper valveless conduit 40 may extend into middle zone 20 to define its operating capacity. That is, particles stop flowing into the middle zone when particles in the middle zone accumulate to reach upper valveless conduit outlet 45. Thus, there may be a continuous mass of particles from a lower portion of upper zone 10 through upper valveless conduit 40, middle zone 20, and lower valveless conduit 50. In another embodiment, the operating capacity of middle zone 20 is predetermined and an optional upper level sensor, not shown, is used to detect when particles rise to this preset level. In such an embodiment, particles need not reach upper valveless conduit outlet 45 and upper valveless conduit 40 need not extend past the shell of middle zone 20. In other embodiments, the operating capacity of middle zone 20 may be determined by a preset time interval. Use of an adjustable timing interval or high level set point enables the size of each particle batch to be varied from cycle to cycle. The particle levels and/or time increments may be measured and a signal sent to a controller to initiate step 2 when the middle zone has been filled. Thus, particles may continue to flow into middle zone 20 for a time after step 2 begins if the particles are below upper valveless conduit outlet 45 at the end of step 1. In other embodiments, the particle flow may be stopped at this point in the cycle and the apparatus may be held with middle zone 20 filled to its operating capacity until it is desired to continue the particle transfer cycle. This portion of the cycle may also be known as a separate hold or ready step. For example, in the embodiment of FIG. 2, valve 16 is closed to force all the gas upwards through both valveless conduits thereby stopping particles from flowing out of both the upper and middle zones. Similarly, in the embodiment of FIG. 3, valve 14 can be opened in addition to valve 12 to accomplish the same effect.

In step 2 of the cycle, the pressure within middle zone 20 is increased. The middle zone pressure may be increased to stop the transfer of particles from the upper zone. In an embodiment, the middle zone pressure is increased to equilibrate with the higher pressure in lower zone 30. This may be accomplished by introducing gas into middle zone 20 through gas conduit 13. Gas to gas conduit 13 may be supplied from a variety of sources including, but not limited to: gas inlet conduit 11, lower zone 30, and separate supply sources such as facility headers and other zones in the associated or other process units. In the embodiment illustrated in FIG. 2, valve 14 is opened and valve 16 is closed to pressurize middle zone 20. In the embodiment shown in FIG. 3, middle zone 20 is pressurized by opening valve 14 and closing valve 12. There is no need to change the gas flow path as the cycle moves from step 2 to step 3. However, as explained above there are numerous ways of routing the gas flow path to control the desired particle movement. Thus, the invention encompasses changing the gas flow path between and/or within steps 2 and 3 to equilibrate the middle and lower zone pressures and retain particles within upper valveless conduit 40.

Step 3 may be referred to as the empty step of the cycle. As the pressures in the middle and lower zones equalize, particles begin to flow from middle zone 20 through lower valveless conduit 50 towards obstruction or body 60 which is located within lower zone 30. That is, body 60 obstructs the particle flow within lower zone 30. During step 3, gas flows upward through upper valveless conduit 40 at a sufficient rate to prevent the transfer of particles from upper zone 10 into middle zone 20. The level of particles in middle zone 20 falls as particles flow out of lower valveless conduit 50. A minimum particle level in middle zone 20 may be used to decrease the length requirement of lower valveless conduit 50. This may be accomplished in various ways such as using a preset time interval for the transfer, measuring the amount of particles that have entered lower zone 30, and measuring the level of particles remaining in middle zone 20. For example, low level sensor 25 may detect the absence of particles at the low level set point and send a signal to a controller to begin depressurizing or venting the middle zone, step 4. Multiple inputs may be used to manage the particle transfer cycle steps.

In an embodiment, the length of step 3 may be controlled by a timer with low level sensor 25 being used initiate step 4 early if the particles fall below the minimum level set point.

In step 4, the depressurization step, the pressure in middle zone 20 may be decreased to equilibrate the middle and upper zone pressures. In another embodiment, the middle zone pressure may be decreased to stop the transfer of particles from the middle zone. This may be accomplished for example by re-establishing the gas flows that were used in step 1. Thus, in the embodiment of FIG. 2 valve 14 may be closed and valve 16 opened so that the gas flux upward in lower valveless conduit 50 is sufficient to retain particles therein while sufficient gas flows through gas conduit 15 to equalize the pressure between the upper and middle zones. In other embodiments not illustrated, a portion of the gas may flow through gas conduit 15 to another destination or simply be vented. In the embodiment illustrated in FIG. 3, valve 14 is closed and valve 12 is opened to re-establish the gas flow path of step 1 of that embodiment.

Figure 3:
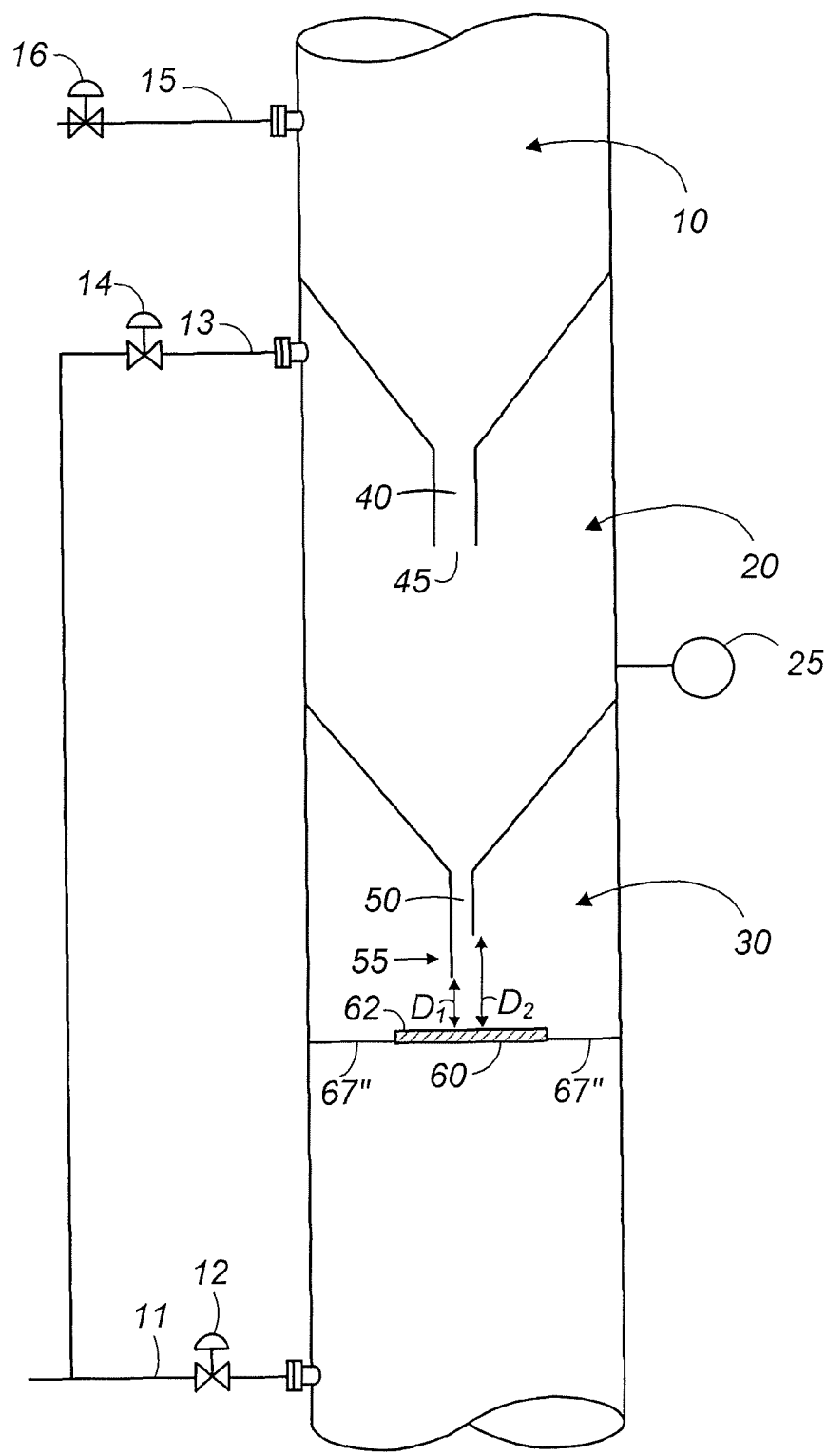
FIG. 3 illustrates other embodiments of the body, the gas conduits, and valveless conduits encompassed by the invention and shows the zones of the apparatus may be within a single vessel.

When the pressure of middle zone 20 is decreased in step 4 to equilibrate with upper zone 10 and increased in step 2 to equilibrate with lower zone 30 it is understood that the pressures in the two zones, superior and inferior, being equilibrated may or may not be the same. For example, pressure differences may exist, if there is some gas flow between the two equilibrated zones, or if they are being controlled independently. Also, there is no requirement that the inferior zone be at the same or lower pressure than the superior zone of the two zones being equilibrated. That is, particles may transfer from either superior zone to the respective inferior zone even though the pressure of the inferior zone is higher than the pressure of the superior zone. The gas flow paths described for the embodiments of FIGS. 2 and 3 show that the invention may provide for the continuous flow of gas to each of the upper, middle, and lower zones throughout a cycle. Further, the embodiment of FIG. 2 provides an uninterrupted flow of gas from the lower zone through the middle zone and into the upper zone throughout the cycle. In other embodiments not illustrated, various gas conduits may be used to control the middle zone pressure and the gas flow rates through the upper and lower valveless particle transfer conduits to regulate the particle movement as herein described.

It is understood that the step numbers used herein are arbitrary and a transfer cycle may be considered to begin with any step and each step is employed at least once during a cycle. The invention encompasses various orders of the steps and some steps may be repeated in the course of transferring a single batch of particles from the upper zone to the lower zone. For example, the transfer of particles in steps 1 and/or 3 may be interrupted by employing steps 2 and 4 multiple times during a transfer cycle. Thus, in an embodiment, the order of steps may be 1—transfer particles from the upper zone to the middle zone; 2—increase the middle zone pressure to stop the transfer of particles; 4—decrease the middle zone pressure to equilibrate the middle and upper zone pressures; 1—transfer particles from the upper zone to the middle zone; 2—increase the middle zone pressure to equilibrate the middle and lower zone pressures; 3—transfer particles from the middle zone towards the body within the lower zone; and 4—decrease the middle zone pressure to equilibrate the middle and upper zone pressures. In another embodiment the order of steps may be 1, 2, 4, 1, 2, 3, 4, 2, 3, and 4. Other steps such as purging the middle zone may be included in a transfer cycle.

Returning to the discussion of step 3, obstruction or body 60 is located within lower zone 30 to obstruct the particle flow within lower zone 30. Outlet 55 of lower valveless conduit 50 is located above and vertically aligned with planar surface 62 of the body. That is, outlet 55 is located vertically above and horizontally within the planar surface. Body 60 may be spaced apart from the inside surface of the lower zone and secured via one or more support elements 67 as in FIG. 1. For example, the body 60 may be suspended such as by wires or rods 67' in FIG. 2; fastened to or supported by relatively horizontal rails or beams 67" in FIG. 3; or located on a stand secured to a lower portion of the zone. Such supports which are known in the art may be used in any combination to locate the body 60 relative to the lower valveless conduit 50 as described herein. These support elements may in turn be secured to any inside surface of the lower zone or any other internal structures within the lower zone including lower valveless conduit 50. The body and support elements may be of the same or different material of construction suitable for the process conditions. In an embodiment, the support is of the same material of construction as that of the lower zone inside surface.

In the embodiment of FIG. 1, outlet 55 of lower valveless conduit 50 is located vertically above planar surface 62 of body 60. Outlet 55 may be vertically spaced apart from planar surface 62. Body 60 may be a solid imperforate object or it may comprise one or more perforations that permit gas to flow through the body. As used herein, "perforations" includes holes, gaps, slots, other openings, and combinations thereof which are sufficiently small to prevent the particles from passing through the body. The body may be impervious to the particles being transferred, that is, a particle impervious body. Outlet 55, as depicted in FIG. 1, may be a uniform distance, D, above planar surface 62, which may be an upper planar surface. Body 60 obstructs the particle flow as particles emerge or are discharged from outlet 55 of lower valveless conduit 50 towards planar surface 62 which may be horizontal. Particles may bounce, roll, or otherwise be diverted off the planar surface and pass to the portion of lower zone 30 below the planar surface. Particles discharged from outlet 55 may strike other particles which have accumulated on the planar surface and be deflected or diverted around body 60 without actually making contact with the body itself. The particle flow within the lower zone is obstructed by a particle impervious body in this embodiment.

Figure 4A:
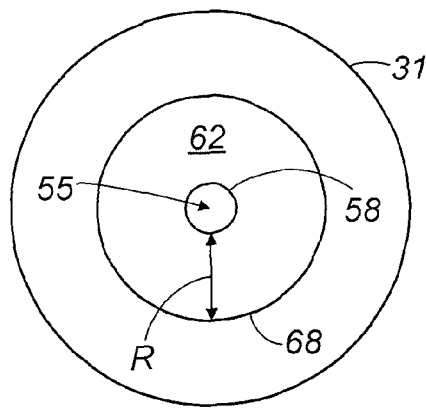
FIGS. 4A-4C illustrate projections of the lower valveless conduit outlet onto the planar surface of the body corresponding to FIGS. 1-3, respectively.

Lower valveless conduit 50 preferably extends into lower zone 30 as shown in FIG. 1, though this extension into lower zone 30 is not required. Outlet 55 of lower valveless conduit 50 is also located horizontally within planar surface 62. That is, a projection of outlet 55 downward onto planar surface 62 in the lower zone may be depicted as illustrated in FIG. 4A.

The inner surface of lower valveless conduit 50 at the outlet 55 defines the outlet perimeter 58 which is horizontally within the perimeter 68 of planar surface 62 as shown by the projection of outlet perimeter 58 on planar surface 62. In the embodiment illustrated in FIG. 4A, outlet perimeter 58 and planar surface perimeter 68 are concentric circles and thus are spaced apart by a constant horizontal distance, R. FIG. 4A also shows horizontal separation between the planar surface perimeter 68 and the inner surface 31 of the lower zone.

Body 60 may be fabricated in any shape sufficient to obstruct particles discharged by lower valveless conduit 50 during step 3. Particles may accumulate or mound on the body planar surface during step 3 and may reach a level to contact the lower valveless transfer conduit outlet 55. That is, body 60 and lower valveless conduit 50 are configured to facilitate forming a continuous mass of particles between middle zone 20 and body 60 through lower valveless conduit 50 during a portion of the particle transfer cycle. The continuous mass of particles comprises particles contacting the body, particles within the lower valveless conduit, and particles within the middle zone. Though it is preferred to form this continuous mass of particles during each particle transfer cycle, this is not required. The invention will continue to transfer particles from the upper zone to the lower zone as described even if this continuous mass of particles in not formed. The nature of the particles is one variable or factor which affects the formation of the particle mound or pile. It is well known to those skilled in the art of designing solids flow systems to conduct experiments to determine flow characteristics of the particular solid involved. The angle of repose of the particles is a well known property of particles that is determined by depositing the particles on a horizontal surface with negligible velocity to form a pile. The angle formed between the slope of the pile and the horizontal surface is the angle of repose. See Andrew W. Jenike, Storage and Flow of Solids, Bulletin No. 123 of the Utah Engineering Experiment Station Sixth Printing (revised), March, 1970, University of Utah.

Under the test conditions for determining the angle of repose, the height of the mound formed equals the horizontal distance between the discharge point and the perimeter of the mound's base multiplied by the tangent of $\theta$ where $\theta$ is the angle of repose in degrees. However, conditions during particle transfer with the invention may vary substantially from the conditions used to determine the angle of repose and the height of the particle mound in the invention may be greater or less than that obtained when determining the angle of repose. Many variables may affect the formation and slope of the particle mound on the planar surface and whether the particles will reach a height sufficient to contact the lower valveless transfer conduit outlet 55. Non-limiting examples of such variables may include: the particle velocity towards the planar surface, the gas flow paths and velocities, the difference in pressure between the middle and lower zones, the particle transfer rate, the particle height in the middle zone, and particle variables such as the coefficients of friction between the particles and between the particles and the planar surface, the particle size, shape, and variations in the size and shape.

The continuous mass of particles may be formed during step 3. Particles may transfer from conduit 50 towards the body planar surface 62 at a greater rate than the particle transfer rate from the planar surface as the particles pass off the planar surface perimeter to the volume of the lower zone below the planar surface. Particles may continue to transfer from the middle zone into the lower zone towards body planar surface 62 moving as a continuous mass. The height of particles on the planar surface may fall below conduit outlet 55 as the particle transfer rate from conduit 50 decreases. Similar to the transition to step 2, pressurization, particle transfer towards the body planar surface 62 may continue during a portion of step 4, depressurization. Also, particle transfer from the planar surface 62 to the volume of the lower zone below the planar surface may continue during at least a portion of step 4. The size of the planar surface is at least sufficient to encompass the projection of outlet 55 and provide an area for particles to mound towards the outlet. The planar surface size is constrained by the design of the lower zone. There must be a sufficient space between the planar surface and the inner surface of the lower zone to accommodate the particle transfer rate.

The vertical distance, D, between outlet 55 and planar surface 62 may be limited to a maximum value. In an embodiment, the vertical distance, D, separating the planar surface 62 and lower valveless conduit outlet 55 is no more than about $1.25 * R * \tan \theta$, where R is the horizontal distance separating the outlet perimeter 58 and the planar surface perimeter 68 and $\theta$ is the angle of repose of the particles in degrees. In another embodiment, D is no more than about 1.15* R *tan θ; and D may be no more than about 1* R *tan θ. Likewise, the vertical distance, D, separating outlet 55 and planar surface 62 must be sufficient to discharge the particles being transferred and D may be limited to a minimum value. In an embodiment, the vertical distance, D, is at least about five times the average particle diameter. In another embodiment, D is at least about 0.35* R *tan θ; and D may be at least about 0.75* R *tan θ. In an embodiment, the vertical distance, D, may be limited to a range between a minimum value and a maximum value. For example, D may range from least about 0.35* R *tan θ to about 1.25* R *tan θ, and in another embodiment D may range from least about 0.75* R *tan θ to about 1.25* R *tan θ. The above limitations may apply and are easy to assess in some embodiments when outlet 55 and outlet perimeter 58 are a uniform vertical distance above planar surface 62 and the horizontal distance, R, separating outlet perimeter 58 and planar surface perimeter 68 is uniform. However, the invention encompasses many different configurations of the lower valveless conduit, diverse particles, and operating conditions each of which may impact the relationship between vertical distance D and horizontal distance R.

In the embodiment of FIG. 2, body 60 comprises floor 61, side walls 63 and retained particles that define the planar surface 62 of the body. Thus, the body may be unitary or it may comprise various similar or dissimilar elements to obstruct the particle flow and define the planar surface. As shown, some particles may be retained by the body. Although the particles cannot pass through the particle impervious body, the retained particles may be moved or displaced from the body such as by the impact of other particles. In another embodiment, the retained particles may be fixed in place by any conventional technique such as welding, gluing, and covering with a screen or grate. When the particles being transferred also define a portion of the planar surface, they may be added to the body during operation in the first or subsequent particle transfer cycles. As illustrated in FIG. 2, side walls 63 may be vertical and define the perimeter 68 of planar surface 62. In other embodiments not illustrated, the side walls may be angled to create a planar surface which is larger or smaller than the surface area of the base. The use of particles, affixed or not, to define at least part of the planar surface exemplifies that the planar surface or a portion thereof may be irregular, rough, and uneven. Particles that define, at least in part, the planar surface may be different than the particles being transferred. In such an embodiment it is preferred that the surface particles be affixed to the body if displacement into the rest of the apparatus or process would be detrimental.

This embodiment illustrates that the location of the planar surface may be defined by where the base of the particle mound forms. For example, additional particles deposited on the mound may slide, roll, or otherwise travel down the slope of the mound and off the mound along the plane of the mound's base. Also, the perimeter of the planar surface and the perimeter of the particle mound, or portions thereof, may coincide such that the particles fall from the coincident perimeters to a lower elevation without creating another larger mound having a base in a lower plane. Thus, as illustrated in FIG. 2, the upper surface of body floor 61 is not the planar surface. Particles traveling down the slope of the formed mound do not travel along or fall from the upper surface of body floor 61. Rather, the planar surface 62, illustrated by the dashed line, is the imaginary, two-dimensional plane that is defined by the upper surfaces of the side walls as the base of the particle mound will form at this elevation. Similarly, an imaginary plane may be used to define the planar surface when the surface is rough or includes small irregularities.

Figure 4B:
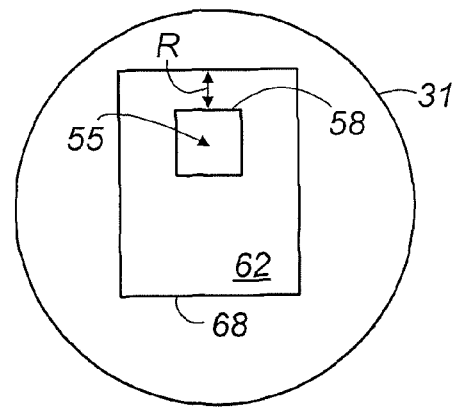

FIG. 4B illustrates the downward projection view of the embodiment of the lower zone of FIG. 2 showing outlet perimeter 58 may be a square within a rectangular planar surface perimeter 68. Again, the planar surface 62 is spaced apart from the inner surface 31 of the lower zone to allow particles to pass to the lower portion of the zone 30 below the planar surface. As shown, there is no requirement for the cross sectional areas or perimeters of the outlet 55 and planar surface 62 to be of any particular shape or have the same shape or be equidistantly spaced apart. As also shown, there is no requirement that the outlet 55 or planar surface be centered in the lower zone. Outlet 55 of lower transfer conduit 50 and body 60 are configured with the outlet being located vertically above and horizontally within the planar surface. That is, outlet 55 is above and vertically aligned with planar surface 62 and the body obstructs the particle flow within the lower zone.

When the vertical distance, D, between outlet 55 and planar surface 62 is uniform and the horizontal distance, R, between the perimeters of the outlet and the planar surface varies as in this embodiment, relationships specified between D and R, if any, may be more specific. For example, if the particle mound reaches the outlet perimeter where R is at its minimum value as illustrated, then the particle mound will reach the entire perimeter of the outlet barring any unusual conditions such as localized gas flows. Thus, a maximum vertical distance may be defined as D being no more than about 1.25* R *tan θ where R is the minimum value of R. In another embodiment, the particles do not reach the outlet where R is at the minimum value, but at another location along the perimeter of the outlet. Thus, the continuous mass of particles may be formed even though the mound does not reach all portions of the outlet. That is, the relationship between D and R may need to be evaluated such that D is determined at each point along the outlet perimeter and the corresponding value of R is the minimum horizontal distance from that point to the perimeter of the planar surface. If a minimum vertical distance is defined such that D is at least about 0.35* R *tan θ, it may be sufficient for this to be satisfied at the portion of the outlet perimeter where R is at its minimum value. It is not necessary that each portion of the outlet perimeter satisfy a minimum vertical distance requirement. As long as the particle mound does not prevent the flow of particles, the invention will operate. For example, particles may be able to travel down the mound, such as, moving in a continuous mass downward with the mound and/or traveling down the slope of the mound, and pass off the planar surface to the lower portion of lower zone 30 at a portion of the perimeter sufficient for the particle transfer rate. The transfer rate of particles from outlet 55 may vary even within step 3 and the particles may stop flowing for brief periods of time.

Figure 4C:
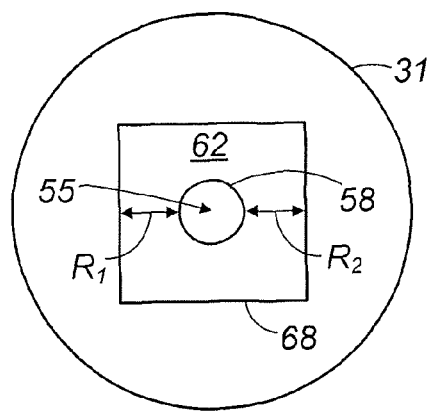

As illustrated in FIG. 3 and corresponding FIG. 4C, the outlet 55 of lower valveless conduit 50 may be configured to have a circular perimeter, but with half of the outlet perimeter being spaced apart from the planar surface 62 by a distance, $D_1$, while the other half of the outlet perimeter is spaced apart from the planar surface 62 by a distance, $D_2$. FIG. 4C illustrates as discussed above that the relationship specified between D and R, if any, may be determined for each $D_N$ and corresponding $R_N$. In an embodiment, the continuous mass of particles between the body and the middle zone may be formed when the mound of particles on the planar surface reaches one or more points along the perimeter of outlet 55. In another embodiment, a portion of the outlet perimeter may be sufficiently spaced above the planar surface to enable the transfer of particles while another portion of the outlet perimeter is spaced closer to or even contacts the planar surface. It is not necessary for particles to transfer at every point along the outlet's perimeter. For example, it may be sufficient that at least about 25% of the outlet perimeter be spaced vertically above the planar surface by a distance of at least about five times the average particle diameter. In another embodiment, at least about 10% of the outlet perimeter is spaced vertically above the planar surface by a distance, D where D is at least about 0.35* R *tan θ. The portion of the outlet perimeter meeting such embodiments need not be at the same vertical height above the planar surface and need not be a continuous portion of the outlet perimeter.

FIGS. 5A-5D illustrate a few non-limiting configurations of the lower valveless transfer conduit 50 and the obstruction or body 60 which are encompassed by the invention. Although the configurations differ, the same reference numerals are used to identify the corresponding elements in each Figure. As in FIGS. 4A-4C, the support element(s) are not illustrated in these views as they are not necessary for an understanding of the configurations. It is readily apparent that myriad other configurations are encompassed by the invention.

FIG. 5A shows planar surface 62 of body 60 may be offset from the horizontal by an angle β. Generally, as this angle, β, between planar surface 62 and the imaginary horizontal plane increases, the vertical distance D between the planar surface 62 and outlet 55 should be decreased to facilitate formation of the particle mound. It is preferred that angle β be no more than angle θ, the angle of repose of the particles being transferred. That is, the planar surface may be within θ degrees of horizontal. In an embodiment, the planar surface may be within 0.5* θ degrees of horizontal, and in another embodiment, the planar surface may be within 0.25*θ degrees of horizontal. A sloped planar surface may be configured with a vertically non-uniform outlet 55 as show or with a vertically uniform outlet. As before, D may be determined at each point along the perimeter 58 of outlet 55 as illustrated by $D_1$ and $D_2$.

As shown in FIG. 5B, lower valveless conduit 50 need not extend into lower zone 30 and more than one such conduit may be used. Both outlets 55 are located vertically above and horizontally within planar surface 62. Although body 60 may comprise multiple planar surfaces, the planar surface of the invention may be defined as the planar surface that would support or define the base of the particle mound. Thus, where the slope of the sides of the body are vertical as in other embodiments or not vertical but too steep as in this embodiment to support a particle mound, the planar surface 62 and its perimeter 68 are defined by the upper surface which may support a particle mound. There is no requirement that the sides of the body are sloped uniformly and one side may be sloped or comprise other planar surfaces to support a particle mound and thus be part of the planar surface defining a lower perimeter while another side is not part of the planar surface. Thus, the planar surface need not be located in a single horizontal plane. As illustrated by a number of the embodiments herein, planar surface 62 may be an upper planar surface or the uppermost planar surface of body 60, but this is not required. Body 60 may comprise any number of protrusions or extensions that form planar surfaces which may or may not be covered by particles but which do not define the planar surface of the invention because the elevated planar surface does not define the base of the particle mound.

FIG. 5C illustrates that a portion of planar surface 62 may abut or be attached to the inner surface of the lower zone and another portion of the planar surface may be spaced apart from the inner surface of the lower zone. Such a configuration may impact the formation of a particle mound. For example, the inner surface of the zone may act as a side wall and particles unable to pass off the planar surface at that location may raise the planar surface closer to outlet 55 as discussed in FIG. 2. This embodiment also highlights that the relationship between D and R to define a minimum D (or equally a maximum R), if any, considers R where the particles may pass freely from the perimeter of the planar surface and the particles are not blocked such as by the inner surface of the lower zone. This embodiment also shows that the lower valveless conduit 50 need not be strictly vertical, but may be angled relative to true vertical. Also, a conduit may be tapered along its entire length or a portion thereof towards outlet 55. In other embodiments, not shown, tapering of a valveless conduit towards the outlet does not require an extensive distance along the conduit. These non-vertical and tapering embodiments may also be used in upper conduit 40. These conduit configurations may be used independently.

FIG. 5D illustrates another embodiment of the invention wherein outlet 55 is located vertically above and horizontally within planar surface 62 of body 60. Although body 60 may retain particles on planar surface 62, body 60 does not have an internal particle retention volume. Body 60 may comprise at least one passageway 65 which provides particle communication from the planar surface through the body to the volume of the lower zone below the body. The use of one or more such passageways provides another path for the particles to pass through the lower zone. The configuration of passageway 65, such as the size, number, location through the body, geometry, and other parameters may be varied to obtain the desired particle flow. All of the particles may flow through the passageway or passageways. In another embodiment a portion of the particles may pass through the passageway(s) and another portion of the particles may pass over or around the perimeter of the planar surface of the body. Similar to the use of a sloped planar surface, a passageway through the body may help ensure that after a continuous mass of particles from the body through the lower valveless conduit to the middle zone is formed, this mass does not prevent the continued transfer of particles. As described above, the invention may include a transitory mass of particles comprising particles contacting the planar surface, particles within the lower valveless conduit, and particles within the middle zone as the particle cycle progresses.

By regulating the particle transfer rate towards the planar surface of the body for a given configuration of the lower valveless conduit and the body, the formation and continued existence of the continuous mass of particles from the middle zone to the body may be controlled. In an embodiment, this continuous mass of particles may exist for a portion of step 3. In another embodiment, the continuous mass of particles may exist for a portion of step 4 ; and the height of the particle mound on the body planar surface 62 may fall below the level of conduit outlet 55 before the beginning of step 1. Thus, particles may transfer from the planar surface to the volume of lower zone 30 below the planar surface during step 4. In yet another embodiment, planar surface 62 is configured to release essentially all of the particles that have accumulated on the planar surface before the subsequent step 3 such as by having a non-horizontal planar surface. This configuration alone or in combination with other parameters such as the smoothness of the surface, the relationship between D and R, and the uniformity of that relationship may facilitate the particles sliding, rolling, or otherwise falling off the planar surface. That is, at least some particles discharged from outlet 55 may contact the planar surface when step 3 begins. Lower valveless conduit 50 provides particle communication to the planar surface 62 of body 60, and lower valveless conduit 50 and the body or planar surface may be in particle communication even if the lower valveless conduit and body or planar surface are not connected.

During the particle transfer cycle, the inventory in upper zone 10 may be continuously and/or intermittently replenished with particles such as from an associated or integrated process zone and/or as added from a fresh particle feed hopper. Likewise, particles delivered to lower zone 30 may be withdrawn from or pass out of the lower zone continuously and/or intermittently. It is preferred that an inventory or surge volume of particles be maintained in both the upper and lower zones throughout the particle transfer cycle. As previously described, upper zone 10 may also provide one or more functions of an associated or integrated process unit including regeneration zones. Non-limiting examples include: a particle feed hopper, a reaction zone, an atmosphere purge zone, another catalyst transfer zone, a reduction zone, and an elutriation zone. The internal pressure of upper zone 10 may be independently controlled by means well known in the art. For example, upper zone 10 may be in fluid communication with a process zone so that the upper zone pressure depends upon and varies with the pressure in that process zone. The upper zone pressure is not critical and may be atmospheric, sub-atmospheric, or super atmospheric.

Lower zone 30 may be a holding vessel, or surge zone from which the particles are transferred by other means such as pneumatic conveying. In other embodiments, lower zone 30 may provide one or more functions of an associated or integrated process unit including regeneration zones. Non-limiting examples include: a particle feed hopper, a reaction zone, an atmosphere purge zone, another catalyst transfer zone, a reduction zone, and an elutriation zone. The internal pressure of lower zone 30 may be independently controlled by means well known in the art. For example, lower zone 30 may be in fluid communication with a process zone so that the lower zone pressure depends upon and varies with the pressure in that process zone. In an embodiment, the upper zone pressure may be higher than the lower zone pressure for a portion of the transfer cycle. In another embodiment, lower zone 30 may be maintained at a higher pressure than upper zone 10. For example, upper zone 10 may be maintained at a nominal pressure of 34 kPa (g) and permitted to vary within a range from about 14 to about 55 kPa (g) while the nominal pressure of lower zone 30 may be 241 kPa (g) within a range from about 207 to about 276 kPa (g). In another embodiment, upper zone 10 may be maintained at a nominal pressure of 241 kPa (g) and permitted to vary within a range from about 172 to about 310 kPa (g) while the pressure of lower zone 30 may be within a range from about 345 to about 2068 kPa (g). Thus, the differential pressure between the lower zone 30 and upper zone 10 might range from about 35 to about 1896 kPa. However, this invention may be used when the pressure differential between zones is as little as about 0.7 kPa and in excess of 2000 kPa. Middle zone 20 serves as an intermediate zone, and its nominal pressure is adjusted to regulate the flow of the particles.

The apparatus of the invention may be used as a solids flow control device for an entire process, since the flow rate of particles from the upper zone to the lower zone can be varied, as discussed above. The upper, middle, and lower zones may contain other non illustrated apparatus known in the art such as baffles, screens, and deflector cones which may be used to facilitate particle flow and/or direct the particles or the gas through a zone in a desired manner. The components of the present invention may be fabricated from suitable materials of construction, such as metals, plastics, polymers, and composites known to the skilled artisan for compatibility with the particles, and operating conditions, e.g. gas, temperature, and pressure. The size, shape, and density of the particles is only limited by the size of the equipment and the type and flow rates of the gas or gases used. In an embodiment, the particles are spheroidal and have a diameter from about 0.7 mm to about 6.5 mm. In another embodiment, the particles have a diameter from about 1.5 mm to about 3 mm. The particles may be catalysts an example of which is disclosed in U.S. Pat. No. 6,034,018.

As previously noted, particle transfer apparatus of the prior art may be adapted to incorporate the invention. Likewise, standard engineering principles especially those related to the flow of solids and gases and known design methods may be used in this invention. In addition to the teachings herein, the design considerations and methodology described in U.S. Pat. Nos. 4,576,712 and 4,872,969 may be used to practice this invention. For example, the pressure in the upper and lower zones, the minimum and maximum gas flow rates upwards through the zones and the valveless conduits, and the required particle transfer rate are design factors that are often fixed by the associated process unit. The length of the particle column inside the valveless conduit, the height of particles in the zone above the valveless conduit, and the diameter of the conduit may be balanced so that changing the pressures and gas flow paths as described herein controls whether particles will flow down through or be retained within the conduit. The design method includes limiting the gas flow rates and pressure differentials to avoid fluidizing particles within the zones and to prevent particles from being suddenly forced up or down the valveless conduits.

Thus, it is known that the internal pressures of the upper and lower zones, the minimum and maximum gas flow rates, the identities of the gas and the particles, and the required range of particle transfer rates, may be used to determine various parameters of the invention. These parameters include: the normal minimum and maximum volumes occupied by the particles in the zones, the particle heights required in the zones above the transfer conduits, the diameter of the transfer conduits, and the lengths of the transfer conduits. These and other parameters such as the gas conduit size and arrangement may characterize a particular embodiment encompassed by the invention.

In an embodiment, a hydrocarbon feed is contacted with catalyst particles moving downward through a hydrocarbon conversion process reaction zone. The catalyst is withdrawn from the reactor and conveyed upwards to a top portion of a regeneration zone. The catalyst passes downward through the regeneration zone undergoing one or more treatment steps. The catalyst is withdrawn from the regeneration zone and passed downward to an upper zone of a particle transfer apparatus. The upper zone pressure may be less than the reaction zone pressure. The particle transfer apparatus transfers the catalyst from the upper zone to the lower zone wherein the catalyst flow is obstructed by a particle impervious body as described above. The catalyst, now at a higher pressure, may be conveyed upwards to a top or upper portion of the reaction zone by a known pneumatic transport system such as described in U.S. Pat. Nos. 5,716,516 and 5,338,440.

Moving bed systems and processes which employ them are well known in the art. See for example U.S. Pat. Nos. 3,725,249 and 3,692,496. The reaction zone is oriented substantially vertically (i.e. sufficiently vertical for catalyst to flow downward at least in part by gravity) and may be divided into multiple reactors or sub zones, for example, to manage the heat of reaction. The reaction zone may consist of a single vertical stack of one or more sub zones, or the reaction zone may be split into two or more vertical stacks to manage structural height limitations. A stack may comprise more than one vessel. It is also important to note that the reactants may be contacted with the catalyst bed in either an upward, downward, or radial flow fashion with the latter being preferred. In addition, the hydrocarbon feed may be in the vapor phase when contacting with the catalyst bed. That is, the catalyst moves gradually downward in the reaction and regeneration zones as a non-fluidized, dense phase or compact bed that is withdrawn from the bottom or lower portion of the reaction and regeneration zones and is replenished by adding catalyst to the top portion of these zones. The catalyst withdrawn from the reaction zone is lifted to the top of the regeneration zone by equipment known in the art including mechanical devices such as screw or bucket conveyors or star valves. Preferably, the catalyst is lifted by a pneumatic transport system.

In the reaction zone, the catalyst may deactivate over time by one or more mechanisms including deposition of carbonaceous material or coke upon the catalyst, sintering or agglomeration of catalyst metals, loss of catalytic promoters such as halogens, and exposure to the reaction atmosphere at reaction temperatures up to 760° C. and pressures ranging from about 0 to about 6,900 kPa(g). As used herein, "reaction temperature" means the weighted average inlet temperature (WAIT), which is the average of the inlet temperature to the first bed of catalyst contacted with the feed and each subsequent bed of catalyst following a heating or cooling stage to manage the heat of reaction weighted by the quantity of catalyst in the corresponding reactor. Frequently, the reaction conditions include the presence of hydrogen that may be introduced separately or combined with the hydrocarbon feed. Hydrocarbon products from the reactor are often cooled and separated into vapor and liquid streams such as in a flash drum or vapor/liquid separator. All or a portion of the vapor stream, containing hydrogen may be recycled to the reaction zone while the liquid stream may be sent to storage, blended with other streams or processed further.

The regeneration zone is designed and operated to restore or rejuvenate the catalyst performance and may include multiple zones and/or treatment steps. Non-limiting examples include a burn or combustion zone, a halogenation zone, a drying zone, and a cooling zone. The regeneration zone may include other known zones such as an elutriation zone and a disengaging zone. The regeneration zone may comprise one or more vessels which are substantially vertically aligned in one or more stacks. Additional regeneration zone details are available in the art such as U.S. Pat. No. 6,034,018. The regeneration zone may operate at a pressure ranging generally from about 0 to about 6900 kpa(g) and a temperature from about 370° C. to about 538° C. Often, the regeneration zone includes an atmosphere containing oxygen in contrast to the reaction zone hydrocarbon/hydrogen atmosphere. Thus, separation of the reactor and regenerator atmospheres may be important to prevent undesirable side reactions. Various known elements such as nitrogen seals or bubbles, isolation valves, and pressure differentials to maintain desired purges and gas flows may be used to prevent the hydrogen and oxygen atmospheres from mixing.

The catalyst being withdrawn from the reaction zone may be purged with hydrogen to keep excess hydrocarbons in the reaction product stream. In an embodiment, the reaction zone atmosphere such as hydrogen and/or remaining hydrocarbon gas surrounding the catalyst is purged with nitrogen before the catalyst enters the oxygen containing atmosphere. Oxygen may be introduced to the regenerator vessel, or oxygen may be added upstream of the regenerator, for example, in a disengaging vessel or isolation valves of the regeneration zone. This change from the reaction zone atmosphere to an inert or nitrogen atmosphere may be conducted before or after the catalyst is lifted or conveyed from the bottom of the reaction zone to the top of the regeneration zone. Likewise, the change from the regeneration zone oxygen atmosphere may be accomplished by a nitrogen purge followed by introduction of a reaction zone gas or reducing gas, such as hydrogen. This atmosphere change is usually completed below the regeneration zone before the catalyst enters the upper zone of the particle transfer zone or apparatus. However, this atmosphere change may be accomplished within the particle transfer apparatus or after the catalyst exits the particle transfer apparatus, before or after the catalyst is lifted to the top of the reactor zone. Low pressure differentials ranging for example from about 2 to about 14 kPa may be sufficient to maintain proper nitrogen purges or flows to keep the regeneration and reaction zone atmospheres separated. Catalyst may be purged with nitrogen in a conduit or the catalyst may enter a nitrogen containing vessel as it moves through the process.

The catalyst may also undergo a reduction step. If needed, the reduction step is normally performed after the catalyst leaves the regenerator vessel when the catalyst is under a reducing gas or reaction zone gas atmosphere. In an embodiment, the reduction step occurs in the upper zone of the particle transfer apparatus. In another embodiment, the reduction step occurs in a reduction zone located atop the reactor in the reaction zone. Typical reduction conditions include an atmosphere comprising hydrogen, a temperature ranging from about 315° C. to about 540° C., and a super atmospheric pressure.

In an embodiment, the hydrocarbon conversion process is a reforming process which is well known in the petroleum refining and petrochemical industries. In brief, the reforming feed comprises a petroleum fraction known as naphtha which may have an initial boiling point from about 40° C. to about 120° C. and an end boiling point from about 145° C. to about 218° C. In an embodiment, the naphtha has an initial boiling point from about 65° C. to about 104° C. and an end boiling point from about 150° C. to about 195° C. The naphtha feed may be a straight run petroleum fraction and/or obtained as a product from one or more petroleum and petrochemical processes such as hydrocracking, hydrotreating, FCC, coking, stream cracking, and any other process which produces a hydrocarbon product in the naphtha boiling range. A number of different reactions may occur in a reforming process including the dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of paraffins, isomerization of alkylcycloparaffins to yield cyclohexanes, isomerization of substituted aromatics, and hydrocracking of paraffins. As a result, reforming is an overall endothermic process and it is common to use more than one reaction zone to allow reheating of the reactants in order to obtain the desired performance.

Reforming conditions may include reaction temperatures from about 425° C. to about 580° C., preferably from about 450° C. to about 560° C.; a pressure from about 240 kPa(g) to about 4830 kPa(g), preferably from about 310 kPa(g) to about 1380 kPa(g); and a liquid hourly space velocity (LHSV), defined as liquid volume of fresh feed per volume of catalyst per hour, from about 0.2 to about 10 $hr^{-1}$. The reforming reaction is carried out in the presence of sufficient hydrogen to provide a hydrogen/hydrocarbon mole ratio from about 0.5:1 to about 10:1. A reforming catalyst typically comprises one or more noble metals (e.g., platinum, iridium, rhodium, and palladium), a halogen component, and a porous carrier or support, such as an alumina. Exemplary catalysts are disclosed in U.S. Pat. No. 6,034,018. The regeneration zone pressure may range from about 0 kPa(g) to about 345 kPa(g). In an embodiment, the regeneration zone pressure ranges from about 0 kpa(g) to about 103 kPa(g), and in another embodiment from about from about 172 kpa(g) to about 310 kPa(g).

The hydrocarbon conversion process may be a dehydrocyclodimerization process wherein the feed comprises $C_2$ to $C_6$ aliphatic hydrocarbons which are converted to aromatics. Preferred feed components include $C_3$ and $C_4$ hydrocarbons such as isobutane, normal butane, isobutene, normal butene, propane and propylene. Diluents, e.g. nitrogen, helium, argon, and neon may also be included in the feed stream. Dehydrocyclodimerization operating conditions may include a reaction temperature from about 350° C. to about 650° C.; a pressure from about 0 kPa(g) to about 2068 kPa(g); and a liquid hourly space velocity from about 0.2 to about 5 $hr^{-1}$. Preferred process conditions include a reaction temperature from about 400° C. to about 600° C.; a pressure from about 0 kPa(g) to about 1034 kPa(g); and a liquid hourly space velocity of from 0.5 to 3.0 $hr^{-1}$. It is understood that, as the average carbon number of the feed increases, a reaction temperature in the lower end of the reaction temperature range is required for optimum performance and conversely, as the average carbon number of the feed decreases, the higher the required reaction temperature. Details of the dehydrocyclodimerization process are found for example in U.S. Pat. Nos. 4,654,455 and 4,746,763.

The dehydrocyclodimerization catalyst may be a dual functional catalyst containing acidic and dehydrogenation components. The acidic function is usually provided by a zeolite which promotes the oligomerization and aromatization reactions, while a non-noble metal component promotes the dehydrogenation function. Exemplary zeolites include ZSM-5, ZSM-8, ZSM-11, ZSM-12, and ZSM-35. One specific example of a catalyst disclosed in U.S. Pat. No. 4,746,763 consists of a ZSM-5 type zeolite, gallium and a phosphorus containing alumina as a binder. Multiple reactors or reaction zones may be used to manage the heat of reaction as described above for the reforming process. The dehydrocyclodimerization process regeneration zone pressure may range from about 0 kpa(g) to about 103 kPa(g). In a particular embodiment, the regeneration conditions may include a step comprising exposing the catalyst to liquid water or water vapor as detailed in U.S. Pat. No. 6,657,096.

In an embodiment, the hydrocarbon conversion process is a dehydrogenation process for the production of olefins from a feed comprising a paraffin. The feed may comprise $C_2$ to $C_{30}$ paraffinic hydrocarbons and in a preferred embodiment comprises $C_2$ to $C_5$ paraffins. General dehydrogenation process conditions include a pressure from about 0 kPa(g) to about 3500 kPa(g); a reaction temperature from about 480° C. to about 760° C.; a liquid hourly space velocity from about 1 to about 10 $hr^{-1}$; and a hydrogen/hydrocarbon mole ratio from about 0.1:1 to about 10:1. Dehydrogenation conditions for $C_4$ to $C_5$ paraffin feeds may include a pressure from about 0 kPa(g) to about 500 kPa(g); a reaction temperature from about 540° C. to about 705° C.; a hydrogen/hydrocarbon mole ratio from about 0.1:1 to about 2:1; and an LHSV of less than 4. Additional details of dehydrogenation processes and catalyst may be found for example in U.S. Pat. Nos. 4,430,517 and 6,969,496.

Generally, the dehydrogenation catalyst comprises a platinum group component, an optional alkali metal component, and a porous inorganic carrier material. The catalyst may also contain promoter metals and a halogen component which improve the performance of the catalyst. In an embodiment, the porous carrier material is a refractory inorganic oxide. The porous carrier material may be an alumina with theta alumina being a preferred material. The platinum group includes palladium, rhodium, ruthenium, osmium and iridium and generally comprises from about 0.01 wt % to about 2 wt % of the final catalyst with the use of platinum being preferred. Potassium and lithium are preferred alkali metal components comprising from about 0.1 wt % to about 5 wt % of the final catalyst. The preferred promoter metal is tin in an amount such that the atomic ratio of tin to platinum is between about 1:1 and about 6:1. A more detailed description of the preparation of the carrier material and the addition of the platinum component and the tin component to the carrier material may be obtained by reference to U.S. Pat. No. 3,745,112. Again, multiple reactors or reaction zones may be used to manage the heat of reaction as described above for the reforming process. The dehydrogenation process regeneration zone pressure may range from about 0 kpa(g) to about 103 kPa(g).

The invention claimed is:

1. A method for transferring particles from an upper zone, through a middle zone, to a lower zone comprising:
   (a) introducing a first gas stream into the lower zone;
   (b) transferring particles downward from the upper zone to the middle zone through an upper valveless conduit, and transferring gas from the lower zone upward through a lower valveless conduit into the middle zone;
   (c) increasing the middle zone pressure;
   (d) transferring particles downward from the middle zone to the lower zone through the lower valveless conduit, obstructing a particle flow in the lower zone with a particle impervious body comprising a planar surface, and transferring gas from the middle zone upward through the upper valveless conduit into the upper zone;
   (e) decreasing the middle zone pressure; and
   (g) controlling the transfer of particles by use of at least one of a controller, a particle level sensor, a pressure gauge, a pressure indicator, a differential pressure sensor, and a timer wherein the upper zone is at a first pressure, the lower zone is at a second pressure, and the second pressure is greater than the first pressure.

2. The method of claim 1 further comprising maintaining an inventory of particles in the upper zone, and maintaining an inventory of particles in the lower zone.

3. The method of claim 1 further comprising sensing the level of particles in the middle zone, and transmitting a signal to initiate step (e).

4. The method of claim 1 wherein particles transferred to the lower zone are discharged from an outlet of the lower valveless conduit towards the planar surface of the particle impervious body.

5. The method of claim 1 wherein particles transferred to the lower zone are discharged from an outlet of the lower valveless conduit, the outlet being located within the lower zone.

6. The method of claim 1 wherein the pressure in the middle zone is greater than a pressure in the upper zone during at least a portion of step (c).

7. The method of claim 1 further comprising forming a continuous mass of particles comprising particles contacting the planar surface of the particle impervious body, particles within the lower valveless conduit, and particles within the middle zone.

8. The method of claim 7 wherein the continuous mass of particles is formed during step (d).

9. The method of claim 7 wherein the continuous mass of particles exists when step (e) is initiated.

10. The method of claim 1 further comprising passing particles from the planar surface of the particle impervious body to the volume of the lower zone below the planar surface.

11. The method of claim 1 further comprising introducing a second gas stream to the middle zone to increase the middle zone pressure in step (c) and venting gas from the middle zone to the upper zone through the upper valveless conduit in step (e).

12. The method of claim 1 further comprising transferring at least a portion of gas from the lower zone to the middle zone through a first gas conduit to increase the middle zone pressure in step (c), and venting gas from the middle zone through a second gas conduit in step (e).

13. The method of claim 1 wherein the middle zone is vented through the second gas conduit to the upper zone in step (e).

14. The method of claim 1 wherein during step (c) the middle zone pressure is equilibrated with the lower zone pressure, and during step (e) the middle zone pressure is equilibrated with the upper zone pressure.

15. A method for transferring particles from an upper zone, through a middle zone, to a lower zone comprising:
(a) introducing a first gas stream into the lower zone;
(b) transferring particles downward from the upper zone to the middle zone through an upper valveless conduit, transferring gas from the middle zone to the upper zone through the upper valveless conduit, and transferring gas from the lower zone upward through a lower valveless conduit into the middle zone;
(c) introducing a second gas stream to the middle zone to increase the middle zone pressure;
(d) transferring particles downward from the middle zone to the lower zone through the lower valveless conduit, obstructing a particle flow in the lower zone with a particle impervious body comprising a planar surface, and transferring gas from the middle zone upward through the upper valveless conduit into the upper zone;
(e) venting the middle zone to the upper zone through the upper valveless conduit to decrease the middle zone pressure: and
(g) controlling the transfer of particles by use of at least one of a controller, a particle level sensor, a pressure gauge, a pressure indicator, a differential pressure sensor, and a timer wherein the upper zone is at a first pressure, the lower zone is at a second pressure, and the second pressure is greater than the first pressure.

16. The method of claim 15 further comprising forming a continuous mass of particles comprising particles contacting the planar surface of the particle impervious body, particles within the lower valveless conduit, and particles within the middle zone.

17. A method for transferring particles from an upper zone, through a middle zone, to a lower zone comprising:
(a) introducing a first gas stream into the lower zone;
(b) transferring particles downward from the upper zone to the middle zone through an upper valveless conduit, and transferring gas from the lower zone upward through a lower valveless conduit into the middle zone;
(c) transferring at least a portion of the gas from the lower zone to the middle zone through a first gas conduit to increase the middle zone pressure;
(d) transferring particles downward from the middle zone to the lower zone through the lower valveless conduit, obstructing a particle flow in the lower zone with a particle impervious body comprising a planar surface, and transferring gas from the middle zone upward through the upper valveless conduit into the upper zone;
(e) venting the middle zone through a second gas conduit to decrease the middle zone pressure; and
(g) controlling the transfer of particles by use of at least one of a controller, a particle level sensor, a pressure gauge, a pressure indicator, a differential pressure sensor, and a timer wherein the upper zone is at a first pressure, the lower zone is at a second pressure, and the second pressure is greater than the first pressure.

18. The method of claim 17 wherein the middle zone is vented through the second gas conduit to the upper zone.

19. The method of claim 17 further comprising forming a continuous mass of particles comprising particles contacting the planar surface of the particle impervious body, particles within the lower valveless conduit, and particles within the middle zone.

* * * * *